United States Patent [19]
Sauer et al.

[11] Patent Number: 5,969,758
[45] Date of Patent: Oct. 19, 1999

[54] DC OFFSET AND GAIN CORRECTION FOR CMOS IMAGE SENSOR

[75] Inventors: Donald Jon Sauer, Allentown; Peter Alan Levine, Trenton, both of N.J.

[73] Assignee: Sarnoff Corporation, Princeton, N.J.

[21] Appl. No.: 08/867,654

[22] Filed: Jun. 2, 1997

[51] Int. Cl.[6] ................................................. H04N 5/217
[52] U.S. Cl. ......................................... 348/241; 348/308
[58] Field of Search .................................... 348/241, 250, 348/302, 308; 250/208.1; 327/91, 94

[56] References Cited

U.S. PATENT DOCUMENTS

| | | | |
|---|---|---|---|
| 4,779,004 | 10/1988 | Tew et al. | |
| 4,809,075 | 2/1989 | Akimoto et al. | 348/241 |
| 4,839,729 | 6/1989 | Ando et al. | 348/241 |
| 4,975,864 | 12/1990 | Sendall et al. | 382/50 |
| 5,034,633 | 7/1991 | Stekelenburg | 327/91 |
| 5,299,032 | 3/1994 | Kurita. | |
| 5,319,263 | 6/1994 | Kannegundla et al. | 327/524 |
| 5,420,631 | 5/1995 | Hamasaki | 348/302 |
| 5,432,335 | 7/1995 | West et al. | 250/208.2 |
| 5,471,515 | 11/1995 | Fossum et al. | 257/292 |
| 5,563,405 | 10/1996 | Woolaway et al. | 250/208.1 |
| 5,591,973 | 1/1997 | Masarik et al. | |
| 5,625,412 | 4/1997 | Aciu et al. | 348/222 |
| 5,739,562 | 4/1998 | Ackland et al. | 257/291 |
| 5,742,047 | 4/1998 | Buhler et al. | 250/208.1 |

*Primary Examiner*—Wendy Garber
*Assistant Examiner*—Aung S. Moe
*Attorney, Agent, or Firm*—William J. Burke

[57] ABSTRACT

An imaging system and method for correcting for differences between correlated double sampling (CDS) circuits of a row of CDS circuits of an imager of the imaging system. According to one embodiment, a plurality of gain correction coefficients having an initial value and a plurality of dc offset correction coefficients having an initial value are stored. A reference dc offset value and a reference gain value are determined, and a dc offset value and a gain value for each CDS circuit is determined. The dc offset value and gain value for each CDS circuit is compared to the reference dc offset value and reference gain value, respectively, and the plurality of gain correction coefficients and the plurality of dc offset correction coefficients is updated in accordance with the comparisons.

29 Claims, 3 Drawing Sheets

DC OFFSET AND GAIN CORRECTION FOR CMOS IMAGE SENSOR

FIELD OF THE INVENTION

The present invention relates to imaging devices and, in particular, to dc offset and gain correction for correlated double sampling (CDS) circuits of complementary metal-oxide semiconductor (CMOS) image sensors.

DESCRIPTION OF THE RELATED ART

Various types of imagers or image sensors are in use today, including charge-coupled device (CCD) image sensors and complementary metal-oxide semiconductor CMOS image sensors. CMOS image sensors typically utilize an array of active pixel image sensors and a row or register of correlated double-sampling (CDS) circuits or amplifiers to sample and hold the output of a given row of pixel image sensors of the array. Each active pixel image sensor of the array of pixels typically contains a pixel amplifying device (usually a source follower). The term active pixel sensor (APS) refers to electronic image sensors within active devices, such as transistors, that are associated with each pixel. CMOS image sensors are often interchangeably referred to as CMOS APS imagers or as CMOS active pixel image sensors. The active pixel image sensors and accompanying circuitry for each pixel of the array will be referred to herein as APS circuits.

CMOS image sensors have several advantages over CCD image sensors. For example, CCD image sensors are not easily integrated with CMOS process peripheral circuitry due to complex fabrication requirements and relatively high cost. However, since CMOS image sensors are formed with the same CMOS process technology as the peripheral circuitry required to operate the CMOS image sensor, such sensors are easier to integrate into a single system-on-chip using integrated circuit (IC) fabrication processes. By using CMOS image sensors, it is possible to have monolithic integration of control logic and timing, image processing, and signal-processing circuitry such as analog-to-digital (A/D) conversion, all within a single sensor chip. Thus, CMOS image sensors can be manufactured at low cost, relative to CCD image sensors, using standard CMOS IC fabrication processes.

Additionally, CCD image sensors typically require three different input voltages with separate power supplies to drive them. CCD image sensors also require relatively high power supply voltages and thus also require relatively high power to operate. By contrast, CMOS devices require only a single power supply, which may also be used to drive peripheral circuitry. This gives CMOS image sensors an advantage in terms of power consumption, and also in terms of the amount of chip area or "real-estate" devoted to power supplies. CMOS image sensors have relatively low power requirements because of the relatively low voltage power supply required for operation, and also because only one row of pixels in the APS array needs to be active during readout.

Despite these advantages, however, CMOS image sensors also have various disadvantages in comparison to CCD image sensors. For example, in conventional CMOS image sensor architecture, a selected or active row of APS pixel circuits is read out in parallel to the row of CDS circuits during a horizontal blanking period. The output of the row of CDS circuits is then scanned rapidly by a horizontal shift register to read the line out to a common output port. One problem with this approach is that any mismatch between the CDS circuits results in a column fixed pattern noise (FPN) artifact in the captured image. Such mismatches are typically caused by different dc and gain offsets in the signal amplification and processing provided by the CDS circuits. FPN artifacts produced by CMOS image sensors are typically very visible since they are not randomly distributed across the image, but are lined up on a column-by-column basis. CCD devices are usually less prone to FPN artifacts since the actual signal charges captured are transferred to and stored in a serial CCD register, and are thus not as affected by differences in signal gain and offset from column to column.

Current CMOS image sensors, therefore, still have inferior imaging performance compared to CCD imagers, due to excessive FPN, and also due to limited dynamic range (about 72 dB) (which is reduced, in part, by excessive FPN), and low fill factor (the ratio of photodetector area to total area of the APS pixel circuitry) which results in lower sensitivity. There is, therefore, a need for improved CMOS image sensors.

An imaging system and method for correcting for differences between correlated double sampling (CDS) circuits of a row of CDS circuits of an imager of the imaging system. According to one embodiment, a plurality of gain correction coefficients having an initial value and a plurality of dc offset correction coefficients having an initial value are stored. A reference dc offset value and a reference gain value are determined, and a dc offset value and a gain value for each CDS circuit is determined. The dc offset value and gain value for each CDS circuit is compared to the reference dc offset value and reference gain value, respectively, and the plurality of gain correction coefficients and the plurality of dc offset correction coefficients is updated in accordance with said comparisons.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

CMOS Image Sensor Circuitry

Figure 1:
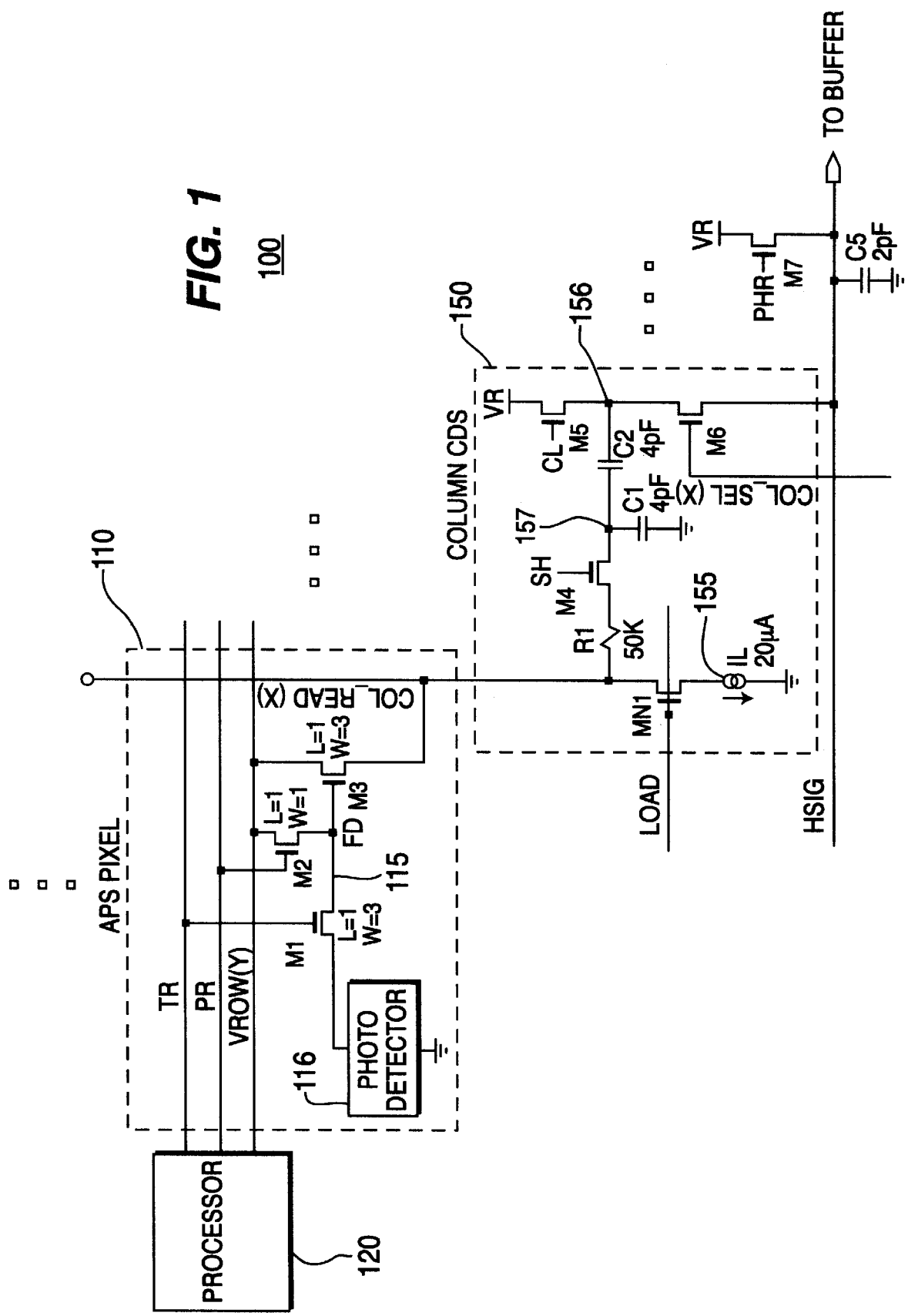
FIG. 1 is a circuit diagram of a CMOS image sensor APS pixel circuit and a column parallel, switched capacitor correlated double sampling (CDS) circuit, in accordance with an embodiment of the present invention.

Referring now to FIG. 1, there is shown a circuit diagram 100 of a CMOS image sensor APS circuit 110 and column parallel, switched capacitor CDS circuit 150, in accordance with an embodiment of the present invention. In one embodiment, APS circuit 110 is one of a 640(H)×480(V) APS array (not shown), and CDS circuit 150 is one of a row of 640 CDS circuits, one for each column of the APS array.

In operation, during a horizontal blanking period preceding display of a given line or row of the APS array, the given row of APS circuits is activated. Each APS circuit provides an output voltage signal related to the intensity of light that has been applied to the APS circuit's photodetector region during the previous integration period (the period during which the photodetectors integrate charge). The output signal of each APS circuit of the activated row is sampled and held by the CDS circuit for the same column. Thereafter, the output of each of the 640 CDS circuits is consecutively applied to a buffer, so that the signal for each column may be amplified and, if desired, applied to an A/D converter (not shown) for further signal processing, and displayed on a monitor (not shown).

APS Circuit with Improved Fill Factor

APS circuit 110, which represents one pixel of the APS array, comprises photodetector 116 and three NMOS field-effect transistors M1, M2, and M3. In one embodiment, photodetector 116 is a virtual gate buried n-channel photodetector. APS circuit 110 is also coupled to bus lines supplying the following signals: transfer gate signal TR, phase reset signal PR, VRow(y), and Col_Read(x). Photodetector 116 is electrically coupled between ground and the source terminal of transistor M1. The gate terminal of transistor M1 is coupled to the TR signal line, and the drain terminal of transistor M1 is coupled to the source terminal of transistor M2 and the gate terminal of transistor M3, the junction of which form a floating diffusion (FD) sensing node 115. The PR signal line is coupled to the gate terminal of transistor M2, and line VRow(y) is coupled to the drain terminals of transistors M2 and M3. The source terminal of transistor M3 is coupled CDS circuit 150 via the Col_Read (x) line. The parenthetical symbols (x) and (y) refer to the x-y coordinate system describing columns (the x coordinate) or rows (the y coordinate) of the APS pixel array, which allows selected columns and rows of the array to be specified for activation.

Transistor M1 is used to control charge transfer from the photodetector 116 to FD node 115, during read out of the light signal charge accumulated. Transistor M2 is used to reset the FD node 115 to a reference level. Transistor M3 is used as a source follower to drive column read line Col_Read(x) in selected rows. Transistor M3 also serves as an isolation switch during periods in which other rows of the APS array are being read. Previous APS circuits utilize a configuration having a transistor similar in functionality to transistor M3 of APS circuit 110, except that a fourth transistor, sometimes called a row select transistor, is coupled in series between the source of transistor M3 and the Col_Read(x) line, to isolate the APS circuit from other APS circuits also coupled to a common line such as the Col_Read(x) line, when the APS circuit is not being read, i.e. when the row containing the APS circuit is not active. However, APS circuit 110 contains a source follower transistor M3 having its output directly coupled to the Col_Read(x) output line, rather than coupled to the Col_Read(x) output line through a row select transistor.

The isolation function normally implemented by a row select transistor is performed in the present invention by controlling the drain and gate voltage of transistor M3, as explained in further detail below with respect to timing diagram 200 of FIG. 2. Because APS circuit 110 utilizes only three transistors instead of four, more area in chip layout can be devoted to photodetector 116, so that a higher fill factor can be achieved. Fill factor is defined as the ratio of photodetector area to total area of the APS circuit layout.

In alternative embodiments, other types of photodetectors may be utilized for photodetector 116 instead of a virtual gate buried n-channel photodetector, such as a N+ to p-substrate photodiode, or a photogate detector. However, a virtual gate buried n-channel photodetector has excellent quantum efficiency over a wide spectral band and can be operated in a complete charge transfer mode, which allows the kTC reset noise on the FD node 115 (described below) to be removed by CDS circuit 150, as described below. Further, a virtual gate photodetector provides better blue response than do polysilicon photogates. However, fabrication of virtual gate detectors requires two additional implantation steps compared to the normal CMOS process, and therefore may not be feasible with some existing low-cost IC fabrication processes. A photodiode detector, by contrast, can be used without modifing a standard CMOS process.

APS circuit 110, in one embodiment, is formed from 0.5 $\mu$m CMOS single-polysilicon, triple-metal (SPTM) process design rules and technology, where each APS circuit is a three-transistor NMOS 7.5×7.5 $\mu$m active pixel having a 47% fill factor. This may be used, for example, with a 640(H)×480(V) APS array having a 4.8×3.6 mm image size, which is compatible with ⅓" optics. In an alternative embodiment, APS circuit 110 is a three-transistor NMOS 5.6×5.6 $\mu$m active pixel having a 34% fill factor. This may be used, for example, with a 640(H)×480(V) APS array having a 3.6×2.7 mm image size, is compatible with ¼" optics. These fill factors are higher than is obtainable if four or more transistors are utilized for each APS circuit.

Switched Capacitor CDS Circuit

The gate terminal of transistor MN1 is coupled to line Load, and the source terminal of transistor MN1 is coupled to a current source 155, which provides a 20 $\mu$A load current IL. The drain terminal of transistor MN1 is coupled to the output of APS circuit 110 via the Col_Read(x) line and to a terminal of resistor R1, which has a resistance of 50 kΩ. The other terminal of resistor R1 is coupled to the source terminal of transistor M4, the gate terminal of which is coupled to sample-and-hold line SH.

The drain terminal of transistor M4 is coupled, at node 157, through capacitor C1 to ground, and to one terminal of capacitor C2. Each of capacitors C1 and C2 has a capacitance of 4 pF. The other terminal of capacitor C2 is coupled, at node 156, to the source terminal of transistor M5 and to the drain terminal of transistor M6. The gate terminal of transistor M5 is coupled to clamp line CL, and the drain terminal of transistor M5 is coupled to reference voltage line VR. The gate terminal of transistor M6 is coupled to column select line Col_Sel(x), and the source of transistor M6 is coupled to horizontal signal line HSig, which is coupled to a buffer (not shown), to ground through a 2 pF parasitic capacitance Cs, and to the source terminal of transistor M7. The gate terminal of transistor M7 is coupled to a phase horizontal reset PHR signal line, and the drain terminal of transistor M7 is coupled to reference voltage line VR.

In CDS circuit 150, capacitors C1 and C2, with accompanying switches M4, M5, and M6, are used to implement the CDS function for each column, and to perform horizontal read out to a buffer. Thus, an input signal is received by CDS circuit 150 via the Col_Read(x) line and provided to the HSig line, as explained in further detail below, without being buffered by an active device. Active amplifiers are typically used in prior art CDS circuitry to buffer signals to implement the CDS and horizontal read out functions. These active amplifiers have dc and gain offsets that contribute to FPN levels of more than 0.5% of the peak-to-peak voltage of the output signal.

By using only switched capacitors C1 and C2 in CDS circuit 150 to clamp, sample and hold, and read out the output signal provided on the Col_Read(x) line by APS circuit 110, the major source of column mismatch due to the dc and/or gain offset of active amplifiers is eliminated. There is typically a remaining second order dc and gain offset mismatch in CDS circuit 150, due primarily to mismatching between the values of capacitors C1 and C2 from column to column. However, capacitor matching is typically better than 0.1%, using capacitors implemented with a gate oxide dielectric. Thus, by utilizing only passive switched capacitor circuits to sample and hold the output pixel signal, CDS circuit 150 substantially reduces column-to-column FPN to less than 0.1% of the peak-to-peak CDS output voltages.

The function of CDS circuit 150 is to capture a CDS output voltage at node 156 that indicates the change in APS output voltage, and then to apply a voltage based on the CDS output voltage to the HSig line. In order to do this, the change in APS output voltage must be reflected in the CDS output voltage, but not the APS reference voltage and any kTC noise components that are part of the APS reference voltage. First, as will be explained in greater detail below, the difference between reference voltage VR and the APS reference voltage is applied across capacitor C2, and then the CDS output voltage at node 156 is allowed to float, initially at the reference voltage VR. Then, after the APS output voltage changes, the new APS output voltage is applied to node 157, which causes the CDS output voltage at node 156 falls by an amount equal to the change in the APS output voltage. Next, capacitors C1 and C2 are isolated from APS circuit 110 so that they form a series capacitance, and the APS output voltage is represented as a net signal charge stored in the series connection of capacitors C1 and C2. Then, node 156 is coupled to the HSig line, which impresses a new voltage on the HSig line in accordance with the known relationship between the series connection of capacitors C1 and C2 and parasitic capacitance Cs, since capacitor Cs was initially charged with reference voltage VR.

CDS circuit 150 is able to perform these functions by providing two capacitors (C1 and C2), coupled to three switches (transistors M4, M5, and M6), wherein the first switch (M4) selectively couples the junction of first terminals of the first and second capacitors C1, C2 (node 157) to the Col_Read(x) line, which supplies the input signal to be captured from APS circuit 110. The second switch (M5) selectively couples the node 156 coupled to the second terminal of the second capacitor (C2) to a reference voltage VR, and the third switch (M6) selectively couples node 156 to the HSig line.

Operation of APS Circuit and Switched Capacitor CDS Circuit

Figure 2:
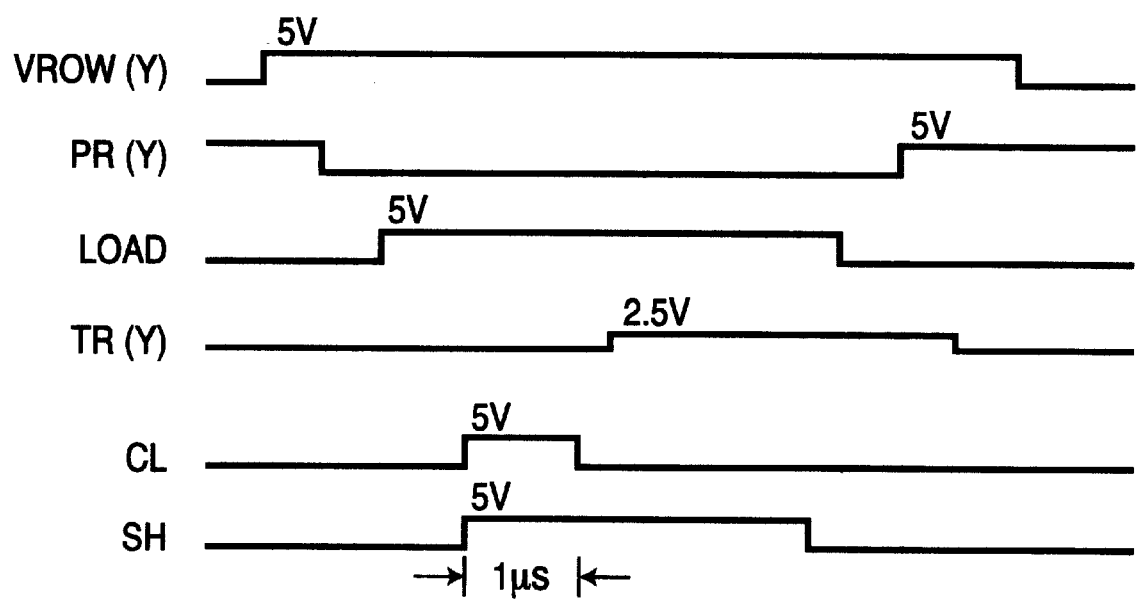
FIG. 2 is a timing diagram illustrating the waveforms used to operate the APS circuit and CDS circuit of FIG. 1, in accordance with the present invention.

Referring now to FIG. 2, there is shown is a timing diagram 200 illustrating the waveforms used to operate APS circuit 110 and CDS circuit 150 of FIG. 1 during a horizontal blanking period, in accordance with the present invention. The input signals applied to lines VRow(y), PR(y), Load, TR(y), CL, and SH, are generated by signal generation circuitry, such as a general-purpose programmed processor, such as processor 120.

Initial Reset

Preceding the horizontal blanking period for the current row, photodetector 116 has been accumulating, or "integrating," charge in accordance with the light intensity reaching the surface area of photodetector 116, during the preceding integration period. The integration period begins after the row containing APS circuit 110 is reset after the previous read of the row, typically 1/30 or 1/60 second previously, depending upon the frame display rate. After a row is read, each APS circuit is reset the signal on line PR(y) being switched from low to high (5 V), and TR(y) being switched from high (2.5 V) to low (0.5 V), as explained in further detail below. When APS circuit 110 is reset, photodetector 116 is set to a voltage of approximately 2.0 V and is floating with respect to the rest of APS circuit 110 since TR(y) is low and thus transistor M1 is open.

During the integration period, as photons impinge upon the surface area of photodetector 116, a negative charge accumulates, thereby lowering the initial 2.0 V voltage in accordance with the intensity of the light integrated during this period. This voltage is clamped at a minimum of approximately 0 V, in part to avoid blooming. Blooming is a phenomenon in which excess charge beyond pixel saturation spills over into adjacent pixels, causing blurring and related image artifacts. Thus, at the beginning of the horizontal blanking period, there will be a charge at photodetector 116 and an accompanying voltage in the range of 2.0 V to 0 V. This charge will be transferred to FD node 115, where it produces a corresponding negative voltage change. This voltage change is then transferred to and sampled by CDS circuit 150, as described in further detail below.

Isolation Function of Source Follower Transistor

In previous APS circuits, the VRow(y) line supplies a fixed power supply voltage. In the present invention, VRow(y) provides 5 V only during the horizontal blanking period, so that transistor M3 can provide the isolation function previously provided by a row select transistor. When VRow(y) is off, i.e. provides a 1 V signal, and PR(y) is high, transistor M2 is turned on, which clamps FD node 115 and the gate of transistor M3 to the voltage on line VRow(y), i.e. approximately 1 V. Thus, when the current row (and hence current APS circuit 110) is not active, the gate terminal of transistor M3 is held low by VRow(y) via transistor M2, the gate terminal of which is held high by PR(y). This keeps transistor M3 tamed off by providing an open circuit between APS circuit 110 and the Col_Read(x) line, thus providing isolation between APS circuit 110 and line Col_Read(x) and the other 479 APS circuits that are coupled to the Col_Read(x) line. In this manner, transistor M3, which serves as a source follower to apply the output signal at its gate terminal to the column read line Col_Read(x) at its source terminal, also serves as an isolation switch when other rows of the APS array are active, i.e. during the integration period of APS circuit 110.

Output Signal Readout and Capture During Horizontal Blanking Period

At the beginning of the horizontal blanking period, the signal on line VRow(y) switches from 1 V to 5 V, while the voltage of line PR(y) remains at 5 V. This resets FD node 115 to (5 V—Vtn), where Vtn is the threshold voltage of transistor M2. Vtn is approximately 0.6 V, so that voltage at FD node 115 is set to approximately 4.4 V at this point, plus or minus a small amount of kTC noise, typically one millivolt (0.001 V) or less in magnitude. Next, line PR(y) switches from high to low, which switches off transistor M2, thus allowing FD node 115 to float so that its voltage can decrease when charge is transferred from the photodetector 116. kTC noise (where k is the Boltzmann constant, T is temperature, and C is capacitance) is caused by thermal noise in the resistance of the MOS channel of transistor M2 when it is switched off. As an example, in a particular resetting instance the kTC noise may be 0.001 V.

The preconditioned voltage of approximately 4.4 V (+kTC noise) at FD node 115 is a sufficiently high initial voltage that can be pulled down by the charge transfer from photodetector 116, when TR(y) is switched high a short time later. Resetting the voltage at FD node 115 in this manner may be referred to as preconditioning or precharging the node, since the node is thereby made receptive to having charge transferred from the photodetector 116.

Next, the Load line switches high, thereby switching on transistor MN1 of CDS circuit 150, allowing current source 155 to draw current IL through the source terminal of source follower transistor M3. The 5 V potential on line VRow(y) acts as the drain supply for transistor M3 in source-follower mode. Transistor M3 thereby acts as a source-follower amplifier to output a voltage on the Col_Read(x) line approximately equal to its gate voltage minus a threshold drop of approximately 0.6 V.

Thus, using the current example, since the voltage at the gate of transistor M3 is approximately 4.4 V+kTC noise= 4.401 V, the output voltage on the Col_Read(x) line is approximately 3.8 V+kTC noise=3.801 V, in the period before the photo signal charge is transferred to FD node 115. The voltage (3.801 V) on the Col_Read(x) line at this stage may be referred to as the APS reference voltage, since it serves as a reference to measure the voltage difference which will be caused when the photo signal charge is transferred to FD node 115. In general, the output voltage appearing on the Col_Read(x) line, and produced by source follower transistor M3, may be referred to as the APS output voltage. The signal to be captured by CDS circuit 150 is the difference between the APS output voltage after the photo signal charge is transferred to FD node 115 and the APS reference voltage, which reference voltage may include a component due to kTC noise. This signal is a difference caused by the quantity of photosignal charge transferred to FD node 115, and thus represents the intensity of light impinging upon photodetector 116 during the integration period.

During approximately the next 3 $\mu$s after the Load line switches high, the transfer gate line TR remains low at approximately 0.5 V and the sample-and-hold pulse SH as well as the clamp pulse CL is applied to CDS circuit 150 in order to store the output reference voltage (minus VR) across capacitor C2 of CDS circuit 150. When CL and SH go high, transistors M5 and M4 switch open. This causes the APS reference voltage of 3.801 V to be applied to node 157 and reference voltage VR (3 V) to be applied to node 156, which may be referred to as the CDS output voltage. Thus, capacitor C2 receives a charge corresponding to a differential voltage of (3–APS reference voltage)=(3–(3.8+kTC noise))=(3–3.801)=–0.801 V. This allows the kTC noise to be removed, as described below. When using a photodiode instead of a virtual gate detector, the kTC noise associated with resetting the photodiode cannot be removed using CDS processing. In this case, the kTC noise will typically add about 40 electrons rms to the readout noise floor assuming a photodetector capacitance of 10 fF.

Next, while the SH line remains high, the CL line is switched low, causing the CDS output voltage at node 156 to float. Thus, when the voltage at node 157 changes in accordance with the negative step output voltage change on the Col_Read(x) line in accordance with the light charge captured, the CDS output voltage at node 156 will fall by the same amount since it will remain 0.801 V below the voltage at node 157.

Less than 1 $\mu$s after CL switches low, line TR(y) switches high to 2.5 V from 0.5 V, which causes transistor M1 to switch on. This, in turn, causes any charge stored during the integration period on photodetector 116 to be transferred through transistor M1 to FD node 115. This pulls down voltage at FD node 115 (e.g., 4.401 V) proportional to the amount of charge that had been accumulated, which itself is proportional to the intensity of light received by the pixel during the integration period. The capacitance of FD node 115 may be somewhat smaller than the capacitance of photodetector 116, causing an amplification of the voltage differential, since charge is conserved, in accordance with the relation charge=capacitance times change in voltage. In one embodiment, this amplification is on the order of approximately 2, so that the negative voltage change at photodetector 116 caused by the accumulation of charge corresponds to a larger voltage change at FD node 115. For example, a –0.5 V change across photodetector 116 may cause a –1 V change at FD node 115 and also on the Col_Read(x) line.

Thus, when line TR(y) switches to 2.5 V, the light signal charge stored in photodetector 116 is switched onto FD node 115, causing a negative going signal voltage step on the Col_Read(x) line. Assuming, for example, a change in voltage at FD node 115 of –1 V, the voltage at FD node 115 falls from 4.401 V to 3.301 V, and the voltage on the Col_Read(x) line falls from 3.801 V to 2.801 V, where the 2.801 V=(3.8 V+kTC noise)–1 V.

While SH remains high, the new output voltage on the Col_Read(x) line (2.801 V) is applied across capacitor C1 at node 157. I.e., the voltage at node 157 falls by 1 V, which change is indicative of the amount of light sensed. Since the CDS output voltage at node 156 is floating, it also falls by 1 V (from VR=3 V) and remains 0.801 V below the voltage at node 157, and thus has a voltage (2.801–0.801) or (3–1)=2.0 V. Thus, because only the change in voltage due to the change in the voltage on the Col_Read(x) line is reflected in the new voltage at node 157, the kTC noise is effectively removed from affecting the voltage applied to the HSig line.

The sample-and-hold pulse on line SH next changes to low, after having remained high for approximately 3 $\mu$s, to isolate the series combination of capacitors C1 and C2 from transistor M4 and the rest of the circuitry coupled thereto. Thus, at this point, the CDS output voltage is 2.0 V across the series combination of capacitors C1 and C2, which have a combined impedance of 2 pF. By using switched capacitors, therefore, CDS circuit at this point has caused a voltage change from a known reference voltage (VR) across a known capacitance, the voltage change corresponding only to the change in APS output voltage, and not to any kTC noise. Since the change in APS output voltage itself corresponds to the amount of charge accumulated on photodetector 116, the CDS output voltage may be used to determine the amount of light integrated by photodetector 116, since the CDS output voltage was originally at a known reference voltage VR.

Reset for Next Integration Period

Thus, at the end of this period, the voltage at node 156 is equal to the reference voltage VR (nominally 3 V), minus the signal voltage component, which is stored as a net signal charge by the series connection of capacitors C1 and C2. After line SH switches low, the source follower load current IL is removed by switching the Load line low, and line PR(y) switches to 5 V, while line TR(y) remains high. This resets photodetector 116 to approximately 2.0 V, and line TR(y) then switches low to isolate photodetector 116, so that photodetector 116 is once again ready to start accumulating charge for the next integration period. Next, line VRow(y) switches low to 1 V, while PR(y) remains high. As explained above, this turns on transistor M2, which clamps the gate of transistor M3 (FD node 115) to line VRow(y). This keeps transistor M3 turned off, thus providing isolation between APS circuit 110 and line Col_Read(x).

Readout of CDS Output Voltages

After a current row or line of pixels has been read from the APS array into the row of CDS circuits, during a horizontal blanking period, the row of CDS output voltages, which may be used to determine a row of pixel values, may be read out of the row of CDS circuits (from node 156) for display or other purposes, during a scan line period, by scanning the Col_Sel(x) control lines in accordance with signals generated by a horizontal scanning shift register (not shown) at the horizontal pixel rate. The net signal charge stored by the series connection of capacitors C1 and C2 in each column is rapidly scanned to a single output bus line HSig at the horizontal clock rate by sequentially activating the Col_Sel(x) control lines. The PHR and Col_Sel(x) lines supply nonoverlapping positive going pulses so that the HSig line is initially reset to the reference potential VR (=3 V) when PHR is high. Line PHR then goes low and line Col_Sel(x) goes high, which redistributes the net signal charge stored on C1 and C2 onto Cs.

In one embodiment, the values of capacitors C1 and C2 are selected so that their series capacitance is equal to the capacitance Cs on line HSig (e.g. 2 pF). This causes the signal voltage on the HSig line, after readout of the CDS output voltage, to be the average of the CDS output voltage at node 156 (e.g., 2 V in the present example) and the voltage VR=3 V applied to the drain of transistor M7, or 2.5 V. Thus, the signal change on the HSig line of 3.0 V to 2.5 V is 0.5 V, which is one-half the signal change −1 V that occurred in the CDS output voltage at node 156. Given a known parasitic capacitance Cs, and known capacitances C1 and C2, the signal change from an initial voltage of VR on line HSig, is a determinate fraction (in the present case, ½) of the signal change in the CDS output voltage at node 156, which is itself identical to the signal change at FD node 115.

Thus, the signal change at the HSig line can be used to determine the amount of light received by photodiode 116 during the previous integration period. For example, after reading the CDS output voltage by coupling node 156 to the HSig line, the voltage on the HSig line decreases from 3.0 V to a new voltage, which is then applied to a buffer and to processing circuitry. The new voltage is subtracted from the reference voltage VR=3 V to determine the signal change or difference on the HSig line. This signal change is one-half the signal change of the CDS output voltage, which is itself proportionate to the amount of signal charge captured by APS circuit 110. Thus, the difference between the new HSig voltage and the initial reference voltage is indicative of the amount of light impinging on photodetector 116 of APS circuit 110 during the most recent integration period.

The bandwidth of CDS circuit 150 may be controlled by adjusting the values of R1, C1, and C2. For example, in the embodiment described, the clamp time constant is 0.4 $\mu$s, which corresponds to a bandwidth of 400 KHz. If the APS circuit 110 source-follower transistor M3 has a wideband noise level of 30 nV/√Hz, then the source-follower M3 noise contribution is about 3.6 electrons rms referred to FD node 115 (for a FD node capacitance of 20 fF). Also, if C1=C2=4 pF, as in the described embodiment, then the quadrature sum of the kTC noise generated by C1 and C2 in CDS circuit 150 is about 5.7 electrons referred to FD node 115.

Column Gain and DC Offset Correction

As explained above, CDS circuits may have different dc offsets and gain, which can lead to column FPN artifacts in the captured image. In prior art CDS circuits which employ active devices for signal amplification purposes, these differential parameters are typically due to different dc offsets and gains of the active devices within the CDS circuits of the row of CDS circuits. In switched-capacitor CDS circuit 150 described above, capacitor mismatching and mismatching between other components of CDS circuit 150 (with respect to other CDS circuits) can also cause differential gains and dc offsets, although of a smaller magnitude than is typical with active-component CDS circuits. Additionally, circuit parameters may change during operation, leading to changes in dc offset and gain mismatches between columns.

There is provided herein a method of correcting the differences in dc offset and gain of CDS circuits, such as CDS circuit 150 or active device CDS circuits (not shown), to reduce column FPN. As explained in further detail below, the method involves measuring the dc offset and gain of the CDS circuit for each column of the APS image sensor during the vertical blanking period, and then using a comparison of these values to a continuous running average of reference values to correct for the FPN artifacts that would otherwise appear in the output video due to differences in these parameters. This method may be implemented by processor 120, which is also used to generated the input signals applied to lines VRow(y), PR(y), Load, TR(y), CL, and SH, described above of the circuits of diagram 100 of FIG. 1.

Figure 3:
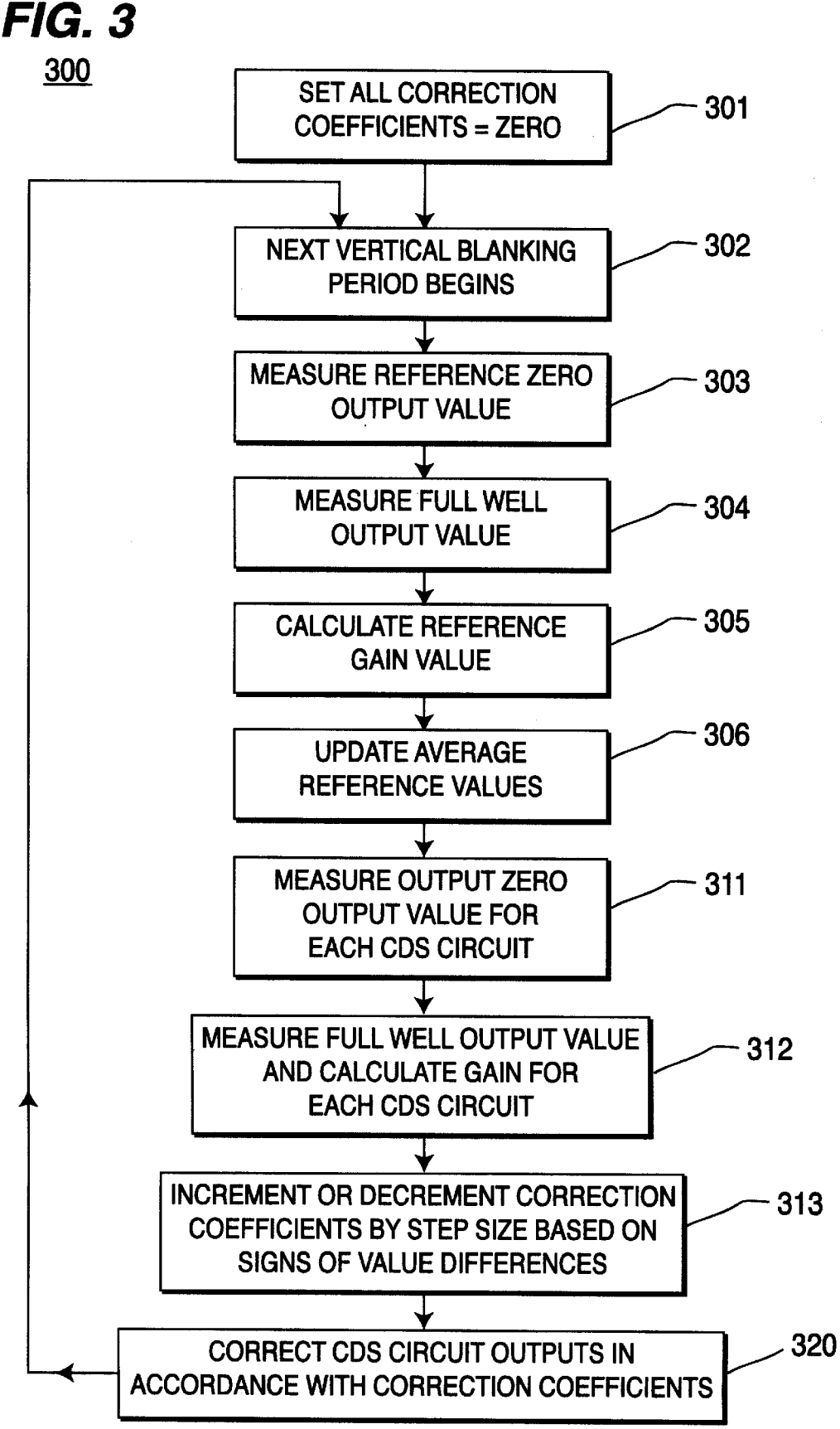
FIG. 3 is a flow chart illustrating a method for correcting the residual dc column offset and gain offset of the CDS circuit of FIG. 1 to reduce column fixed pattern noise, in accordance with an embodiment of the present invention.

Referring now to FIG. 3, there is shown a flow chart 300 illustrating a method for correcting the dc column offset and gain differences of CDS circuit 150 of FIG. 1 to reduce column FPN, in accordance with an embodiment of the present invention. In one embodiment, two digital 1-H digital coefficient line memories or registers are used to store the current dc offset and gain correction coefficients for each column CDS circuit. Initially, all the coefficients are set to zero, since it is initially presumed that no correction is needed for any CDS circuit (step 301), i.e. that there is no mismatching.

Next, a "reference zero output value," which represents the reference dc offset value, is obtained from a single reference CDS circuit for which no correction coefficients will be applied, preferably during the vertical blanking period (steps 302, 303). The vertical blanking period is convenient to use since none of the column CDS circuits is in use at this time to sample the output of any APS circuits, and thus the A/D circuitry normally used to digitize captured pixel signals can be used to implement the correction.

For example, the first CDS circuit of the row of CDS circuits may be selected as the reference CDS circuit. This may be done by applying a "zero change signal" to the Col_Read(x) line which is input to the reference CDS circuit, and applying the sample-and-hold and clamp pulses to the CDS circuit via lines SH and CL, respectively, as explained above with respect to the timing diagram 200 of FIG. 2.

The output signal provided by the CDS circuit (i.e., the voltage on the HSig line after the CDS output voltage is applied thereto) in response to this input zero change signal input may be used as the reference zero output value. The "zero change signal" is equal to a typical voltage, such as the APS reference voltage (e.g. 3.8 V), applied to the Col_Read(x) line before the light charge causes it to step down, i.e. the APS output voltage produced by an APS circuit with zero optical input.

Similarly, a "fill well output value" is obtained from the reference CDS circuit, by applying a full well voltage signal to the Col_Read(x) line, and again applying the sample-and-hold and clamp pulses to the reference CDS circuit (step 304). The full well voltage signal is preferably a nonzero voltage. The output signal provided by the CDS circuit in response to this input full well signal may be used, in conjunction with the reference zero output value, to calculate the reference gain of the reference CDS circuit (step 305).

In one embodiment, a continuous running average of the reference gain and reference zero output values are stored in memory. For example, the average reference values may indicate an average of the last ten reference gain and reference zero output values. It may be desirable to use a running average of the reference values since the differences between these values and those for other CDS circuits may vary by less than the background noise. Using a running average in this manner helps detect these differences even where background noise variations are greater than the FPN caused by gain and dc offset differences.

Thus, once the reference gain and reference zero output values are determined in steps 303 and 305 for the current vertical blanking period, the average reference gain and average reference zero output values are updated, by averaging the last 10 such reference values together (step 306). To perform this averaging, the last ten reference gain and zero output values may also be stored in memory. In alternative embodiments the running average can be calculated with more or less than the last 10 reference values. In other alternative embodiments, averaging is not used at all, and only the current reference values are used for comparison to the corresponding parameters for the other CDS circuits.

Once the reference values are obtained and the average reference values updated, corresponding parameters (dc offset and gain) are measured for each CDS circuit. An input zero change signal is applied to each CDS circuit for each column, to develop the zero output value for each CDS circuit (step 311). This can be done by simultaneously switching all of the vertical (column) Col_Read(x) signal lines to the zero change signal, and measuring the output signal on the HSig line caused by the CDS output voltage.

Similarly, the gain of each CDS circuit is calculated by applying the fulll well voltage signal to each CDS circuit, measuring the full well output value for that CDS circuit by measuring the output signal on the HSig line caused by the CDS output voltage, and computing its gain by using the full well output value and zero output value for that circuit (step 312). Then, the difference between each CDS circuit's zero output value and gain and the average reference zero output value and average reference gain, respectively, are used to determine how to update the corresponding correction coefficients. In one embodiment, the dc offset and gain differences for each CDS circuit are calculated with a digital subtractor, to determine the sign bit, i.e. whether the dc offset and gain for a given CDS circuit are greater than or less than the average reference values. In accordance with the sign bit, the current coefficient values stored in the register are either incremented or decremented by a predetermined incremental step size (step 313).

The correction coefficients are read out to control analog or digital dc offset and gain correction circuitry which operates at the horizontal pixel rate (step 320). The correction coefficients for gain and dc offset may be applied to the APS image sensor on-chip in either the analog or digital signal output. Analog signal correction has a cost advantage in some applications where the analog signal is directly utilized by the system. Alternatively, a corrected digital output can be employed.

With the above-described technique, a digital servo-loop is employed, in which the feedback loop includes the dc offset and gain correction circuitry and therefore the transfer functions of these circuits are not critical as long as they provide sufficient dynamic range for the correction. In one embodiment, the step size for changing the correction coefficients is selected to be below the visible threshold set by random noise.

For CDS circuit 150 of FIG. 1, the residual dc offset and gain errors are expected to be in the range of 0.1% of the peak-to-peak full scale CDS output voltage. Therefore, for implementing such coefficient correction for CDS circuit 150, the resolution required for storing the digital dc offset and gain coefficients to achieve a 20× reduction in errors and provide a correction range of up to 0.3% is approximately 1 part in 60. Thus, two 6-bit correction coefficients for each column CDS circuit can be utilized to implement the FPN correction of this method. For other types of CDS circuits, such as active CDS circuits as used in the prior art, dc offset and gain errors may be higher, and may thus require more bits for correction coefficients.

In this manner, the coefficients of each CDS circuit will gradually converge to the appropriate correction coefficients. The present method also allows continuously updated coefficients to be provided to allow for any changes in the imager or drive circuit parameters during operation. Thus, the present method is able to change the correction coefficients to respond to changes in dc offsets and gain over time. These changes may result, for example, from small voltage or timing variations as the camera temperature changes during normal operation. Thus, the correction coefficients may be used to correct for the FPN artifacts that would otherwise appear in the output video. In an alternative embodiment, the only the dc offset, and not the gain, of the CDS circuits are corrected.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for correcting for differences between correlated double sampling (CDS) circuits of a row of CDS circuits of an imager, the method comprising the steps of:

(a) storing a plurality of gain correction coefficients, one for each CDS circuit;

(b) storing a plurality of dc offset correction coefficients, one for each CDS circuit;

(c) determining a reference dc offset value and a reference gain value;

(d) measuring an actual dc offset value and an actual gain value for each CDS circuit, wherein each CDS circuit has an output;

(e) comparing the actual dc offset value and actual gain value for each CDS circuit to the reference dc offset value and reference gain value, respectively, to determine a dc offset value difference and a gain value difference for each CDS circuit;

(f) updating the stored gain correction coefficient and the stored dc offset correction coefficient for each CDS circuit in accordance with the gain value difference and the dc offset value difference, respectively, for said each CDS circuit; and (g) correcting, with a correction circuit, the output of each CDS circuit in accordance with the stored gain correction coefficient and dc offset correction coefficient for said each CDS circuit to minimize column fixed pattern noise in the row of CDS circuits.

2. The method of claim 1, wherein step (c) comprises the steps of:

(1) applying a zero change signal to the input of a reference CDS circuit and measuring a zero output value output by the reference CDS circuit to determine the reference dc offset value; and (2) applying a full well signal to the input of the reference CDS circuit and measuring a full well output value output by the reference CDS circuit to determine a reference full well output value and calculating the reference gain value in accordance with the zero change signal, full well signal, reference dc offset value, and reference full well output value.

3. The method of claim 1, wherein step (c) comprises the steps of:

(1) applying a zero change signal to the input of a reference CDS circuit and measuring a zero output value output by the reference CDS circuit to determine a current reference dc offset value;

(2) applying a full well signal to the input of the reference CDS circuit and measuring a full well output value output by the reference CDS circuit to determine a reference full well output value and calculating a current reference gain value in accordance with the zero change signal, full well signal, reference dc offset value, and reference full well output value;

(3) determining the reference dc offset value by calculating a running average of the current reference dc offset value and a plurality of previous reference dc offset values; and (4) determining the reference gain value by calculating a running average of the current gain offset value and a plurality of previous reference gain values.

4. The method of claim 1, further comprising the step of repeating steps (c)–(f) for each vertical blanking period.

5. The method of claim 1, wherein each of the plurality of gain correction coefficients and dc offset correction coefficients have an initial value of zero before being updated in step (f).

6. The method of claim 1, wherein:

step (e) comprises the step of computing the sign of the differences between the dc offset value and gain value for each CDS circuit and the reference dc offset value and reference gain value, respectively; and step (f) comprises the step of incrementing or decrementing each correction coefficient by a step size in accordance with the sign of the difference corresponding to said each correction coefficient.

7. The method of claim 6, wherein the step size is small enough to change a correction coefficient by an amount less than the that caused by random noise.

8. The method of claim 1, wherein the reference dc offset value and reference gain value are determined with respect to a reference CDS circuit, wherein the reference CDS circuit is the first CDS circuit of the row of CDS circuits.

9. An imaging system providing means for correcting for differences between correlated double sampling (CDS) circuits of a row of CDS circuits of an imager, the imaging system comprising:

(a) memory means for storing a plurality of gain correction coefficients, one for each CDS circuit and a plurality of dc offset correction coefficients, one for each CDS circuit;

(b) means for determining a reference dc offset value and a reference gain value;

(c) means for measuring an actual dc offset value and an actual gain value for each CDS circuit, wherein each CDS circuit has an output;

(d) means for comparing the actual dc offset value and actual gain value for each CDS circuit to the reference dc offset value and reference gain value, respectively, to determine a dc offset value difference and a gain value difference for each CDS circuit;

(e) means for updating the stored gain correction coefficient and the stored dc offset correction coefficient for each CDS circuit in accordance with the gain value difference and the dc offset value difference, respectively, for said each CDS circuit; and (f) a correction circuit for correcting the output of each CDS circuit in accordance with the stored gain correction coefficient and dc offset correction coefficient for said each CDS circuit to minimize column fixed pattern noise in the row of CDS circuits.

10. The imaging system of claim 9, wherein means (b) comprises:

(1) means for applying a zero change signal to the input of a reference CDS circuit and measuring a zero output value output by the reference CDS circuit to determine the reference dc offset value; and (2) means for applying a full well signal to the input of the reference CDS circuit and measuring a fall well output value output by the reference CDS circuit to determine a reference full well output value and for calculating the reference gain value in accordance with the zero change signal, full well signal, reference dc offset value, and reference fill well output value.

11. The imaging system of claim 9, wherein means (b) comprises:

(1) means for applying a zero change signal to the input of a reference CDS circuit and measuring a zero output value output by the reference CDS circuit to determine a current reference dc offset value;

(2) means for applying a full well signal to the input of a reference CDS circuit and measuring a full well output value output by the reference CDS circuit to determine a reference fall well output value and for calculating a current reference gain value in accordance with the zero change signal, full well signal, reference dc offset value, and reference full well output value;

(3) means for determining the reference dc offset value by calculating a running average of the current reference dc offset value and a plurality of previous reference dc offset values; and (4) means for determining the reference gain value by calculating a running average of the current gain offset value and a plurality of previous reference gain values.

12. The imaging system of claim 9, further comprising means for repeating the functions of means (b)–(e) for each vertical blanking period.

13. The imaging system of claim 9, wherein each of the plurality of gain correction coefficients and dc offset correction coefficients have an initial value of zero before being updated in step (f).

14. The imaging system of claim 9, wherein:

means (d) comprises means for computing the sign of the differences between the dc offset value d gain value for each CDS circuit and the reference dc offset value and reference gain value, respectively; and means (e) comprises means for incrementing or decrementing each correction coefficient by a step size in accordance with the sign of the difference corresponding to said each correction coefficient.

15. The imaging system of claim 14, wherein the step size is small enough to change a correction coefficient by an amount less than the that caused by random noise.

16. The imaging system of claim 9, wherein the reference dc offset value and reference gain value are determined with respect to a reference CDS circuit, wherein the reference CDS circuit is the first CDS circuit of the row of CDS circuits.

17. An imaging system, comprising:
   (1) a row of CDS circuits for sampling output signals provided by pixel circuits of an array of pixel sensor circuits; and
   (2) a processor coupled to input, output, and control lines of each CDS circuit of the row of CDS circuits, wherein the processor:
      (a) stores a plurality of gain correction coefficients, one for each CDS circuit;
      (b) stores a plurality of dc offset correction coefficients, one for each CDS circuit;
      (c) determines a reference dc offset value and a reference gain value;
      (d) measures an actual dc offset value and an actual gain value for each CDS circuit, wherein each CDS circuit has an output;
      (e) compares the actual dc offset value and actual gain value for each CDS circuit to the reference dc offset value and reference gain value, respectively, to determine a dc offset value difference and a gain value difference for each CDS circuit;
      (f) updates the stored gain correction coefficient and the stored dc offset correction coefficient for each CDS circuit in accordance with the gain value difference and the dc offset value difference, respectively, for said each CDS circuit; and
      (g) corrects, with a correction circuit, the outut of each CDS circuit in accordance with the stored gain correction coefficient and dc offset correction coefficient for said each CDS circuit to minimize column fixed pattern noise in the row of CDS circuits.

18. The imaging system of claim 17, wherein the processor determines a reference dc offset value and a reference gain value by:
   applying a zero change signal to the input of a reference CDS circuit and measuring a zero output value output by the reference CDS circuit to determine the reference dc offset value; and
   applying a full well signal to the input of a reference CDS circuit and measuring a full well output value output by the reference CDS circuit to determine a reference full well output value and calculating the reference gain value in accordance with the zero change signal, full well signal, reference dc offset value, and reference full well output value.

19. The imaging system of claim 17, wherein the processor determines a reference dc offset value and a reference gain value by:
   applying a zero change signal to the input of a reference CDS circuit and measuring a zero output value output by the reference CDS circuit to determine a current reference dc offset value;
   applying a full well signal to the input of the reference CDS circuit and measuring a full well output value output by the reference CDS circuit to determine a reference full well output value and calculating a current reference gain value in accordance with the zero change signal, full well signal, reference dc offset value, and reference full well output value;
   determining the reference dc offset value by calculating a running average of the current reference dc offset value and a plurality of previous reference dc offset values; and
   determining the reference gain value by calculating a running average of the current gain offset value and a plurality of previous reference gain values.

20. The imaging system of claim 17, wherein the processor repeats functions (c)–(f) for each vertical blanking period.

21. The imaging system of claim 17, wherein each of the plurality of gain correction coefficients and dc offset correction coefficients have an initial value of zero before being updated in step (f).

22. The imaging system of claim 17, wherein the processor updates the plurality of gain correction coefficients and the plurality of dc offset correction coefficients in accordance with said comparisons by incrementing or decrementing each correction coefficient by a step size in accordance with the sign of said differences, respectively.

23. The imaging system of claim 22, wherein the step size is small enough to change a correction coefficient by an amount less than the that caused by random noise.

24. The imaging system of claim 17, wherein the reference dc offset value and reference gain value are determined with respect to a reference CDS circuit, wherein the reference CDS circuit is the first CDS circuit of the row of CDS circuits.

25. An imaging system comprising:
   (a) a row of CDS circuits;
   (b) memory means for storing a plurality of gain correction coefficients, one for each CDS circuit, and a plurality of dc offset correction coefficients, one for each CDS circuit;
   (c) means for determining a reference dc offset value and a reference gain value;
   (d) means for measuring an actual dc offset value and an actual gain value for each CDS circuit, wherein each CDS circuit has an output;
   (e) means for comparing the actual dc offset value and actual gain value for each CDS circuit to the reference dc offset value and reference gain value, respectively, to determine a dc offset value difference and a gain value difference for each CDS circuit;
   (f) means for updating the stored gain correction coefficient and the stored dc offset correction coefficient for each CDS circuit in accordance with the gain value difference and the dc offset value difference, respectively, for said each CDS circuit; and
   (g) a correction circuit for correcting the output of each CDS circuit in accordance with the stored gain correction coefficient and dc offset correction coefficient for said each CDS circuit to minimize column fixed pattern noise in the row of CDS circuits.

26. A method for correcting for differences between correlated double sampling (CDS) circuits of a row of CDS circuits of an imager, the method comprising the steps of:
   (a) storing a plurality of gain correction coefficients having an initial value;
   (b) storing a plurality of dc offset correction coefficients having an initial value;
   (c) determining a reference dc offset value and a reference gain value, comprising the steps of:
      (1) applying a zero change signal to the input of a reference CDS circuit and measuring a zero output value output by the reference CDS circuit to determine the reference dc offset value; and
      (2) applying a full well signal to the input of the reference CDS circuit and measuring a full well output value output by the reference CDS circuit to determine a reference full well output value and calculating the reference gain value in accordance with the zero change signal, full well signal, reference dc offset value, and reference full well output value;

(d) determining an actual dc offset value and an actual gain value for each CDS circuit;

(e) comparing the actual dc offset value and actual gain value for each CDS circuit to the reference dc offset value and reference gain value, respectively; and (f) updating the plurality of gain correction coefficients and the plurality of dc offset correction coefficients in accordance with said comparisons.

27. An imaging system providing means for correcting for differences between correlated double sampling (CDS) circuits of a row of CDS circuits of an imager, the imaging system comprising:

(a) memory means for storing a plurality of gain correction coefficients having an initial value and a plurality of dc offset correction coefficients having an initial value;

(b) means for determining a reference dc offset value and a reference gain value, said means comprising:
 (1) means for applying a zero change signal to the input of a reference CDS circuit and measuring a zero output value output by the reference CDS circuit to determine the reference dc offset value; and
 (2) means for applying a fall well signal to the input of the reference CDS circuit and measuring a full well output value output by the reference CDS circuit to determine a reference full well output value and for calculating the reference gain value in accordance with the zero change signal, full well signal, reference dc offset value, and reference full well output value;

(c) means for determining an actual dc offset value and an actual gain value for each CDS circuit;

(d) means for comparing the actual dc offset value and actual gain value for each CDS circuit to the reference dc offset value and reference gain value, respectively; and (e) means for updating the plurality of gain correction coefficients and the plurality of dc offset correction coefficients in accordance with said comparisons.

28. An imaging system, comprising:

(1) a row of CDS circuits for sampling output signals provided by pixel circuits of an array of pixel sensor circuits; and (2) a processor coupled to input, output, and control lines of each CDS circuit of the row of CDS circuits, wherein the processor:
 (a) stores a plurality of gain correction coefficients having an initial value;
 (b) stores a plurality of dc offset correction coefficients having an initial value;
 (c) determines a reference dc offset value and a reference gain value by:
  applying a zero change signal to the input of a reference CDS circuit and measuring a zero output value output by the reference CDS circuit to determine the reference dc offset value; and
  applying a full well signal to the input of a reference CDS circuit and measuring a full well output value output by the reference CDS circuit to determine a reference full well output value and calculating the reference gain value in accordance with the zero change signal, full well signal, reference dc offset value, and reference full well output value;
 (d) determines an actual dc offset value and an actual gain value for each CDS circuit;
 (e) compares the actual dc offset value and actual gain value for each CDS circuit to the reference dc offset value and reference gain value, respectively; and
 (f) updates the plurality of gain correction coefficients and the plurality of dc offset correction coefficients in accordance with said comparisons.

29. An imaging system comprising:

(a) a row of CDS circuits;

(b) memory means for storing a plurality of gain correction coefficients having an initial value and a plurality of dc offset correction coefficients having an initial value;

(c) means for determining a reference dc offset value and a reference gain value, said means comprising:
 (1) means for applying a zero change signal to the input of a reference CDS circuit and measuring a zero output value output by the reference CDS circuit to determine the reference dc offset value; and
 (2) means for applying a full well signal to the input of the reference CDS circuit and measuring a full well output value output by the reference CDS circuit to determine a reference full well output value and for calculating the reference gain value in accordance with the zero change signal, full well signal, reference dc offset value, and reference full well output value;

(d) means for determining an actual dc offset value and an actual gain value for each CDS circuit;

(e) means for comparing the actual dc offset value and actual gain value for each CDS circuit to the reference dc offset value and reference gain value, respectively; and (f) means for updating the plurality of gain correction coefficients and the plurality of dc offset correction coefficients in accordance with said comparisons.

* * * * *